US008358610B2

(12) United States Patent
Luo et al.

(10) Patent No.: US 8,358,610 B2
(45) Date of Patent: Jan. 22, 2013

(54) METHOD AND SYSTEM FOR CHANNEL ESTIMATION PROCESSING FOR INTERFERENCE SUPPRESSION

(75) Inventors: Wei Luo, Marlboro, NJ (US); Pan Liu, New York, NY (US); Thirunathan Sutharsan, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 464 days.

(21) Appl. No.: 12/615,237

(22) Filed: Nov. 9, 2009

(65) Prior Publication Data

US 2011/0111761 A1    May 12, 2011

(51) Int. Cl.
*H04B 7/185* (2006.01)
(52) U.S. Cl. ........................................ 370/317; 455/63.1
(58) Field of Classification Search .................. 370/329, 370/317; 455/63.1
See application file for complete search history.

(56) References Cited

U.S. PATENT DOCUMENTS

2009/0052566 A1*   2/2009   Maltsev et al. ............... 375/260

* cited by examiner

*Primary Examiner* — Sai-Ming Chan
(74) *Attorney, Agent, or Firm* — Sterne, Kessler, Goldstein & Fox P.L.L.C.

(57) ABSTRACT

Aspects of a method and system for channel estimation for interference suppression are provided. In this regard, one or more circuits and/or processors of a mobile communication device may generate and/or receive a first set of channel estimates and a second set of channel estimates. The one or more circuits and/or processors may modify the second set of channel estimates based on a comparison of a measure of correlation between the first set of channel estimates and the second set of channel estimates with a threshold. The first set of channel estimates and/or the modified second set of channel estimates may be utilized for cancelling interference in received signals. The first set of channel estimates may be associated with a first transmit antenna of a base transceiver station and the second set of channel estimates may be associated with a second transmit antenna of the base transceiver station.

24 Claims, 11 Drawing Sheets

METHOD AND SYSTEM FOR CHANNEL ESTIMATION PROCESSING FOR INTERFERENCE SUPPRESSION

CROSS-REFERENCE TO RELATED APPLICATIONS/INCORPORATION BY REFERENCE

This application makes reference to:
U.S. patent application Ser. No. 12/582,771 filed on Oct. 21, 2009;
U.S. patent application Ser. No. 12/604,978 filed on Oct. 23, 2009;
U.S. Patent Application Ser. No. 61/242,524 filed on Sep. 15, 2009;
U.S. patent application Ser. No. 12/573,803 filed on Oct. 5, 2009;
U.S. patent application Ser. No. 12/604,976 filed on Oct. 23, 2009;
U.S. patent application Ser. No. 12/611,810 filed on Nov. 3, 2009;
U.S. Patent Application Ser. No. 61/246,797 filed on Sep. 29, 2009;
U.S. patent application Ser. No. 12/575,879 filed on Oct. 8, 2009;
U.S. patent application Ser. No. 61/288,008 filed on Dec. 18, 2009;
U.S. Patent Application Ser. No. 61/242,554 filed on Sep. 15, 2009;
U.S. patent application Ser. No. 12/612,272 filed on Nov. 4, 2009;
U.S. patent application Ser. No. 12/575,840 filed on Oct. 8, 2009;
U.S. patent application Ser. No. 12/605,000 filed on Oct. 23, 2009;
U.S. patent application Ser. No. 12/543,283 filed on Aug. 18, 2009;
U.S. patent application Ser. No. 12/570,736 filed on Sep. 30, 2009;
U.S. patent application Ser. No. 12/577,080 filed on Oct. 9, 2009; and
U.S. patent application Ser. No. 12/603,304 filed on Oct. 21, 2009.

Each of the above referenced applications is hereby incorporated herein by reference in its entirety.

FIELD OF THE INVENTION

Certain embodiments of the invention relate to signal processing. More specifically, certain embodiments of the invention relate to a method and system for channel estimation for interference suppression.

BACKGROUND OF THE INVENTION

Wideband code division multiple access (WCDMA) is a third generation (3G) cellular technology that enables the concurrent transmission of a plurality of distinct digital signals via a common RF channel. WCDMA supports a range of communications services that include voice, high speed data and video communications. One such high speed data communications service, which is based on WCDMA technology, is the high speed downlink packet access (HSDPA) service.

WCDMA is a spread spectrum technology in which each digital signal is coded or "spread" across the RF channel bandwidth using a spreading code. Each of the bits in the coded digital signal is referred to as a "chip". A given base transceiver station (BTS), which concurrently transmits a plurality of distinct digital signals, may encode each of a plurality of distinct digital signals by utilizing a different spreading code for each distinct digital signal. At a typical BTS, each of these spreading codes is referred to as a Walsh code. The Walsh coded digital signal may in turn be scrambled by utilizing a pseudo normal (PN) bit sequence to generate chips. An example of a PN bit sequence is a Gold code. Each of a plurality of BTS within an RF coverage area may utilize a distinct PN bit sequence. Consequently, Walsh codes may be utilized to distinguish distinct digital signals concurrently transmitted from a given BTS via a common RF channel while PN bit sequences may be utilized to distinguish digital signals transmitted by distinct BTSs. The utilization of Walsh codes and PN sequences may increase RF frequency spectrum utilization by allowing a larger number of wireless communications to occur concurrently within a given RF frequency spectrum. Accordingly, a greater number of users may utilize mobile communication devices, such as mobile telephones, Smart phones and/or wireless computing devices, to communicate concurrently via wireless communication networks.

A user utilizing a mobile communication device, $MU\_1$, may be engaged in a communication session with a user utilizing a mobile communication device $MU\_2$ via a base transceiver station, $BTS\_A$ within wireless communication network. For example, the mobile communication device $MU\_1$ may transmit a digital signal to the $BTS\_A$, which the base transceiver station $BTS\_A$ may then transmit to the mobile communication device $MU\_2$. The base transceiver station $BTS\_A$ may encode signals received from the mobile communication device $MU\_1$ and transmitted to the mobile communication device $MU\_2$ by utilizing a Walsh code, $W\_12$, and a PN sequence, $PN\_A$. The mobile communication device $MU\_2$ may receive signals transmitted concurrently by a plurality of base transceiver stations (BTSs) in addition to the base transceiver station $BTS\_A$ within a given RF coverage area. The mobile communication device $MU\_2$ may process the received signals by utilizing a descrambling code that is based on the PN sequence $PN\_A$ and a despreading code that is based on the Walsh code $W\_12$. In doing so, the mobile communication device $MU\_2$ may detect a highest relative signal energy level for signals received from base transceiver station $BTS\_A$, which comprise a digital signal corresponding to mobile communication device $MU\_1$.

However, the mobile communication device $MU\_2$ may also detect signal energy from the digital signals, which correspond to signals from mobile communication devices other than the mobile communication device $MU\_1$. The other signal energy levels from each of these other mobile communication devices may be approximated by Gaussian white noise, but the aggregate noise signal energy level among the other mobile communication device may increase in proportion to the number of other mobile communication devices whose signals are received at the mobile communication device $MU\_2$. This aggregate noise signal energy level may be referred to as multiple access interference (MAI). The MAI may result from signals transmitted by the base transceiver station $BTS\_A$, which originate from signal received at the base transceiver station $BTS\_A$ from mobile communication devices other than mobile communication device $MU\_1$. The MAI may also result from signals transmitted by the base transceiver stations BTSs other than the base transceiver station $BTS\_A$. The MAI and other sources of noise signal energy may interfere with the ability of $MU\_2$ to successfully decode signals received from $MU\_1$.

An additional source of noise signal energy may result from multipath interference. The digital signal energy corresponding to the mobile communication device MU_2, which is transmitted by the base transceiver station BTS_A may disperse in a wavefront referred to as a multipath. Each of the components of the multipath may be referred to as a multipath signal. Each of the multipath signals may experience a different signal propagation path from the base transceiver station BTS_A to the mobile communication device MU_2. Accordingly, different multipath signals may arrive at different time instants at the mobile communication device MU_2. The time duration, which begins at the time instant that the first multipath signal arrives at the mobile communication device MU_2 and ends at the time instant that the last multipath signal arrives at the mobile communication device MU_2 is referred to as a delay spread. The mobile communication device MU_2 may utilize a rake receiver that allows the mobile communication device MU_2 to receive signal energy from a plurality of multipath signals received within a receive window time duration. The receive window time duration may comprise at least a portion of the delay spread time duration. Multipath signals, which are not received within the receive window time duration may also contribute to noise signal energy.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for channel estimation processing for interference suppression, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for channel estimation for interference suppression. In various embodiments of the invention, one or more circuits and/or processors of a mobile communication device may generate and/or receive a first set of channel estimates and a second set of channel estimates. The first set of channel estimates may be associated with a plurality of RF channels between a first transmit antenna of a base transceiver station and one or more receive antennas of the mobile communication device. The base transceiver station may be a non-listened base transceiver station. The second set of channel estimates may be associated with a plurality of RF channels between a second transmit antenna of the base transceiver station and one or more receive antennas of the mobile communication device. The one or more circuits and/or processors may modify the second set of channel estimates based on a comparison of a measure of correlation between the first set of channel estimates and the second set of channel estimates with a threshold. The threshold may be dynamically or statically determined. The first set of channel estimates and/or the modified second set of channel estimates may be utilized for processing received signals. In instances that the measure of correlation is below the threshold, the second set of channel estimates may be modified such that the modified second set of channel estimates is orthogonal to the first set of channel estimates. In instances that the measure of correlation is above the threshold, the second set of channel estimates may be modified by setting each of the channel estimates in the second set to zero.

The first set of channel estimates may be normalized with respect to total power received over all of the plurality of RF channels between the first transmit antenna and the one or more receive antennas. The second set of channel estimates may be normalized with respect to total power received over all of the plurality of RF channels between the second transmit antenna and the one or more receive antennas. The second set of channel estimates may be disregarded in instances that the measure of correlation is above a threshold. Each channel estimate in the first set of channel estimates may indicate a vector of complex channel gains between the first transmit antenna and one of the one or more receive antennas. Each channel estimate in the second set of channel estimates may indicates a complex channel gain between the second transmit antenna and one of the one or more receive antennas. Interference may be suppressed in the received signals based on the first set of channel estimates and/or the modified second set of channel estimates.

Figure 1A:
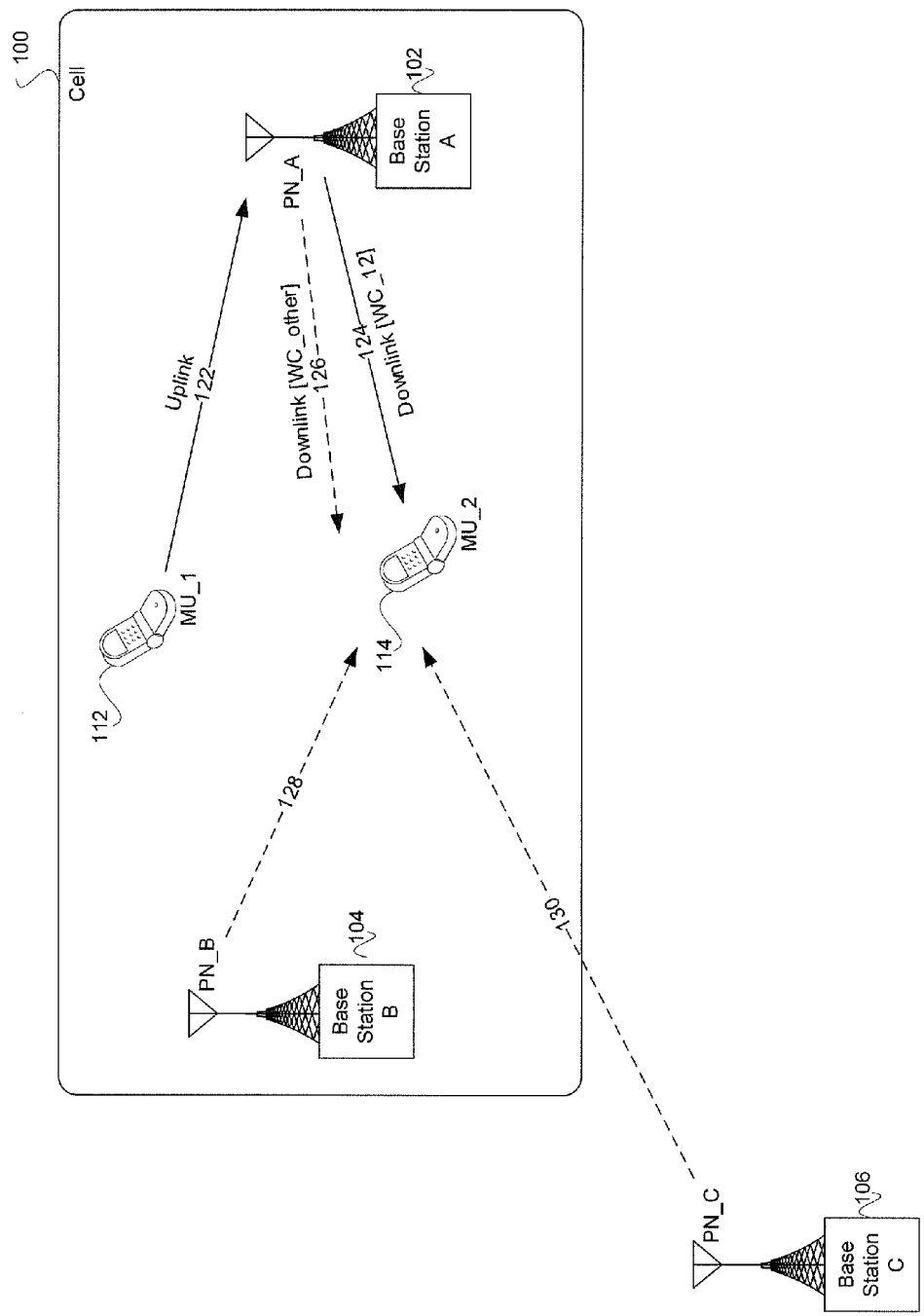
FIG. 1A is a diagram illustrating an exemplary wireless communication system, which is operable to provide interference suppression in WCDMA, in accordance with an embodiment.

FIG. 1A is an illustration of an exemplary wireless communication system, in accordance with an embodiment. Referring to FIG. 1A, there is shown a cell 100 and a BTS C 106. The cell 100 comprises BTS A 102, BTS B 104, mobile communication device MU_1 112 and mobile communication device MU_2 114. The BTS 106 may be located outside of the cell 100.

The mobile communication devices MU_1 112 and MU_2 114 may be engaged in a communication via the BTS A 102. The mobile communication device MU_1 112 may transmit signals to the BTS A 102 via an uplink RF channel 122. In response, the BTS A 102 may transmit signals to the mobile communication device MU_2 114 via a downlink RF channel 124. Signals transmitted by the BTS A 102 may communicate chips that are generated utilizing a scrambling code PN_A. The signals transmitted via RF channel 124 may be spread utilizing a spreading code WC_12. The spreading code WC_12 may comprise an orthogonal variable spreading factor (OVSF) code, for example a Walsh code, which enables the mobile communication device MU_2 114 to distinguish signals transmitted by the BTS A 102 via the downlink RF channel 124 from signals transmitted concurrently by the BTS A 102 via other downlink RF channels, for example downlink RF channel 126. The BTS A 102 may utilize one or more OVSF codes, WC_other, when spreading data transmitted via downlink RF channel 126. The one or more OVSF codes, WC_other, may be distinct from the OVSF code WC_12.

The mobile communication device MU_2 114 may receive MAI signals from RF channel 126, RF channel 128 and/or RF channel 130. As stated above, the signals received via RF channel 126 may be transmitted by the BTS A 102. The signals received via RF channel 128 may be transmitted by the BTS B 104. The signals transmitted by the BTS 104 may be scrambled based on a scrambling code PN_B. The signals received via RF channel 130 may be transmitted by the BTS C 106. The signals transmitted by the BTS C 106 may be scrambled based on a scrambling code PN_C.

The mobile communication device MU_2 114 may be operable to perform a soft handoff from the current serving BTS A 102 to any of a plurality of BTSs located within the cell 100, for example, the BTS B 104. Accordingly, the mobile communication device MU_2 114 may be operable to process received signals based on scrambling code PN_A and/or scrambling code PN_B. In this regard, the mobile communication device MU_2 114 may send data to the BTS A 102 and/or the BTS B 104, and data destined for mobile communication device MU_2 114 may be received via the BTS A 102 and/or the BTS B 104. Thus, the BTS A 102 and the BTS B 104 may be referred to as "listened" BTSs. Conversely, the mobile communication device MU_2 114 may not be operable to perform a soft handoff from the current serving BTS A 102 to a BTS that is outside of the cell 100—the BTS C 106, for example. In this regard, the mobile communication device MU_2 114 may not transmit data to the BTS C 106 or receive data destined for the mobile communication device MU_2 114 from the BTS C 106. Accordingly, the BTS A 102 and the BTS B 104 may be referred to as "non-listened" BTSs.

While the desired signal at the mobile communication device MU_2 114 may be received via RF channel 124, the mobile communication device MU_2 114 may also receive signal energy via the RF channel 126, the RF channel 128 and/or the RF channel 130. The received signal energies from the RF channels 126, 128 and/or 130 may result in MAI, which may interfere with the ability of the mobile communication device MU_2 114 to receive desired signals via RF channel 124. Accordingly, in various aspects of the invention, the mobile communication device MU_2 114 is operable to suppress interference resulting from undesired signals transmitted by listened BTSs. Additionally, even though the BTS is not a listened BTS, information transmitted on the RF channel 130—data transmitted to mobile communication devices other than mobile communication device MU_2 114—may nevertheless interfere with the desired signals on the RF channel 124. Accordingly, in various aspects of the invention, the mobile communication device MU_2 114 is operable to suppress interference from the non-listened BTS 106, or non-listened BTSs.

In various embodiments of the invention, the mobile communication device MU_2 may comprise suitable logic, circuitry and/or code that are operable to receive signal energy via the RF channels 124, 126, 128 and/or 130, and suppress interference signal energy received via the RF channels 126, 128 and/or 130. The mobile communication device MU_2 may utilize an iterative method for interference cancellation. The iterative method may comprise a weighting iteration, one or more weighting and addback iterations, and an addback iteration. For the mobile communication devices 112 and 114 to process multipath information, each of the channels 124, 126, 128, and 130 of FIG. 1A may represent multiple paths, where those multiple paths are separated by a time delay.

Figure 1B:
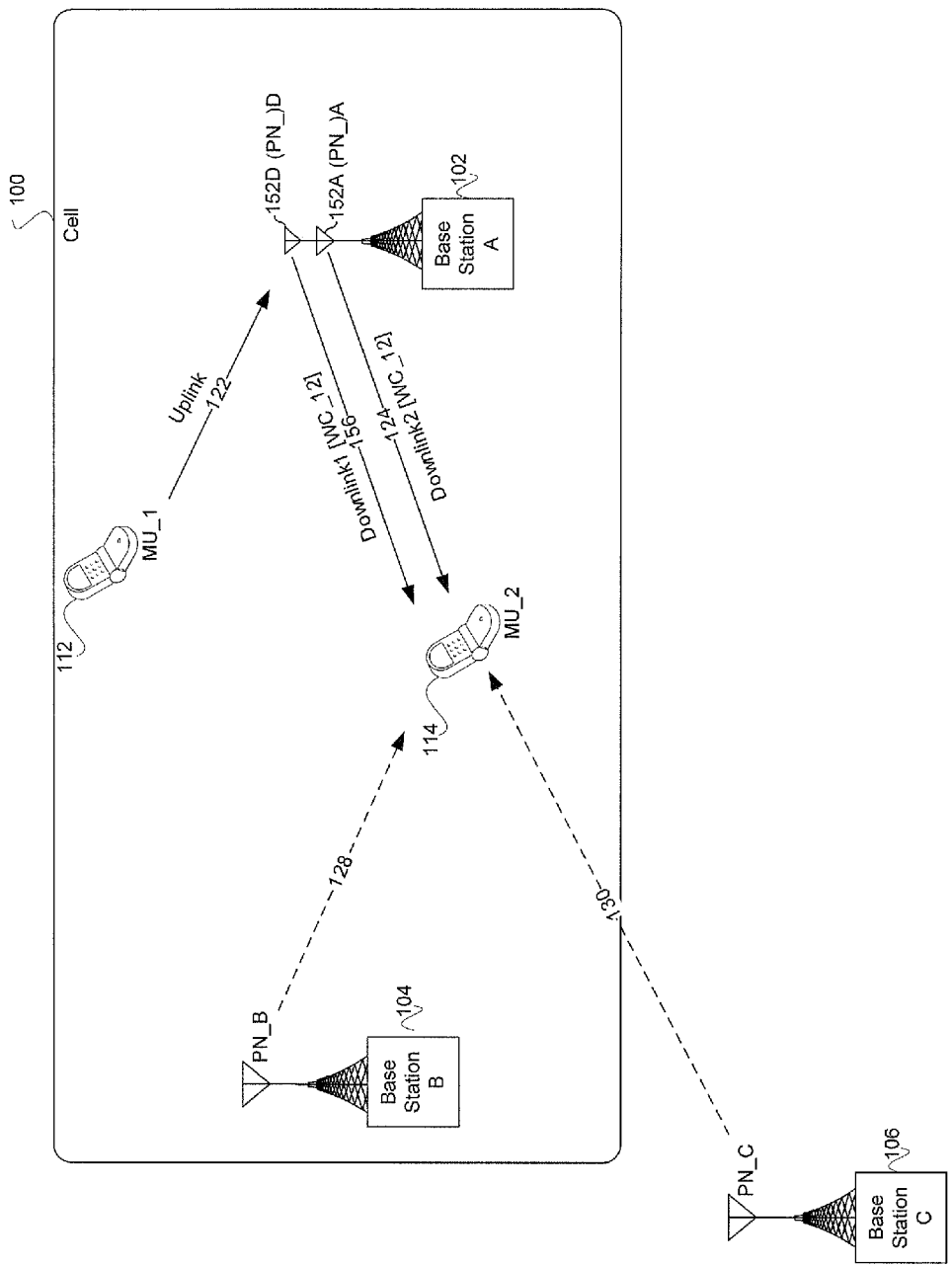
FIG. 1B is a diagram illustrating an exemplary wireless communication system, which is operable to utilize transmit diversity and provide interference suppression in WCDMA, in accordance with an embodiment.

FIG. 1B is a diagram illustrating an exemplary wireless communication system, which is operable to utilize transmit diversity and provide interference suppression in WCDMA, in accordance with an embodiment. In FIG. 1B, the BTS 102 is operable transmit a datastream via antennas 152A and 152D. The datastream may be scrambled utilizing scrambling code PN_A, and spread utilizing spreading code WC_12, before being transmitted via antenna 152A onto RF channel 124. Additionally, the datastream may be scrambled utilizing scrambling code PN_D, and spread utilizing spreading code WC_12, before being transmitted via antenna 152D and RF channel 156. The mobile communication device 114 may be operable to receive and process both channels 156 and 124 such that signal reception is improved over the case in which only a single channel 124 is present. Accordingly, aspects of the invention may enable estimating energy present on the channels 156 and 124 and utilizing the channel estimates to cancel or suppress interference received on the channels 156 and 124. For the mobile communication devices 112 and 114 operable to process multipath information, each of the channels 124, 128, 130 and 156 of FIG. 1B may represent multiple paths, where those multiple paths are separated by a time delay.

Figure 2:
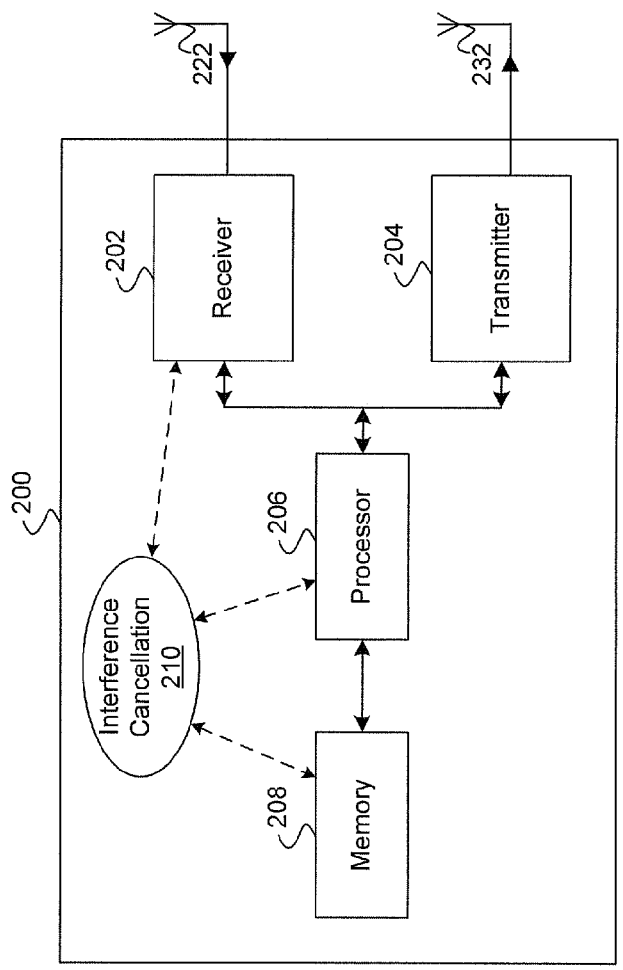
FIG. 2 is a diagram of an exemplary communication device, which is operable to provide interference suppression for WCDMA, in accordance with an embodiment of the invention.

FIG. 2 is a diagram of an exemplary communication device, which may utilize interference suppression for WCDMA, in accordance with an embodiment of the invention. Referring to FIG. 2, there is shown a transceiver system 200, a receiving antenna 222 and a transmitting antenna 232. The transceiver system 200 may comprise at least a receiver 202, a transmitter 204, a processor 206, an interference cancellation module 210 and a memory 208. Although a separate receiver 202 and transmitter 204 are illustrated by FIG. 2, the invention is not limited. In this regard, the transmit function and receive function may be integrated into a single transceiver module. The transceiver system 200 may also comprise a plurality of transmitting antennas and/or a plurality of receiving antennas, for example to support diversity transmission and/or diversity reception. Various embodiments of the invention may comprise a single antenna, which is coupled to the transmitter 204 and receiver 202 via a transmit and receive (T/R) switch. The T/R switch may selectively couple the single antenna to the receiver 202 or to the transmitter 204 under the control of the processor 206, for example.

The receiver 202 may comprise suitable logic, circuitry, interfaces and/or code that may be operable to perform receive functions that may comprise PHY layer function for the reception or signals. These PHY layer functions may comprise, but are not limited to, the amplification of received RF signals, generation of frequency carrier signals corresponding to selected RF channels, for example uplink or downlink channels, the down-conversion of the amplified RF signals by the generated frequency carrier signals, demodulation of data contained in data symbols based on application of a selected demodulation type, and detection of data contained in the demodulated signals. The RF signals may be received via the receiving antenna 222. The receiver 202 may be operable to process the received RF signals to generate baseband signals. A chip-level baseband signal may comprise a plurality of chips. The chip-level baseband signal may be descrambled based on a PN sequence and despread based on an OVSF code, for example a Walsh code, to generate a symbol-level baseband signal. The symbol-level baseband signal may comprise a plurality of data symbols. The receiver 202 may comprise a rake receiver, which in turn comprises a plurality of rake fingers to process a corresponding plurality of received multipath signals.

The transmitter 204 may comprise suitable logic, circuitry, interfaces and/or code that may be operable to perform transmit functions that may comprise PHY layer function for the transmission or signals. These PHY layer functions may comprise, but are not limited to, modulation of received data to generate data symbols based on application of a selected modulation type, generation of frequency carrier signals corresponding to selected RF channels, for example uplink or downlink channels, the up-conversion of the data symbols by the generated frequency carrier signals, and the generation and amplification of RF signals. The RF signals may be transmitted via the transmitting antenna 232.

The memory 208 may comprise suitable logic, circuitry, interfaces and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM).

The interference cancellation module 210 may comprise suitable logic, circuitry and/or code that are operable to suppress interference signals, relative to a desired signal, in a received signal. The received signal may comprise one or more desired signals and one or more interference signals. The interference cancellation module 210 may generate interference suppressed versions of the one or more signals by reducing the signal level for the interference signals relative to the signal level for the desired signals. In an exemplary embodiment of the invention that utilizes transmit diversity, a pair of signals from a pair of transmit antennas may be received via one or more channels by the antenna 222 and processed by system 200. In the case of Tx diversity, the same scrambling code may be used on multiple transmit antennas. The interference cancellation module may treat each transmit antenna as an independent interferer, estimate each interfering signals, and subtract the interfering signals from the received signal that is a composition of signals from multiple sources including the multiple transmit antennas. This may lead to a single interference being subtracted multiple times and therefore amplifying the detrimental effects of the interference. In order to avoid this, the channel estimation from each antenna is preprocessed such that the resulting channel estimation representations have little mutual-correlation.

In operation, the receiver 202 may receive signals via the receiving antenna 222. In an exemplary embodiment of the invention, the receiver 202 may comprise a rake receiver. The receiver 202 may communicate signals to the processor 206 and/or to the interference cancellation module 210.

The receiver 202 may generate timing information that corresponds to each of the fingers in the rake receiver portion of the receiver 202. Each of the fingers in the rake receiver may process signals that are received from a particular BTS within a delay spread time duration. Based on the received RF signals, the receiver may generate chip-level baseband signals. The receiver 202 may communicate the chip-level baseband signals to the interference cancellation module 210. The rake receiver 202 may generate one or more symbol-level baseband signals based on a selected one or more OVSF codes and a selected one or more PN sequences. The symbol-level baseband signals may be communicated to the processor 206. The OVSF codes may be selected based on a specified desired user signal. For example, referring to FIG. 1B, the rake receiver 202 associated with mobile communication device MU_2 may select an OVSF code, WC_12, and PN sequences PN_A and PN_D, which may be utilized to generate the symbol-level baseband signal from the chip-level baseband signal.

The processor 206 may utilize common pilot channel (CPICH) information, communicated by the signals received from the receiver 202, to compute a plurality of channel estimate values or, in various embodiments of the invention, the receiver 202 may compute the channel estimate values. The processor 206 and/or receiver 202 may compute one or more channel estimate values corresponding to multipath signals transmitted by one or more BTSs and received at a finger in the rake receiver. The computed channel estimate values may be represented as a channel estimate matrix, $w''_{b,t,r,f}$, where 'b' represents a numerical index that is associated with a given BTS, 't' represents a numerical index that is associated with a given transmit antenna of the BTS 'b', 'r' represents a numerical index that is associated with a given receive antenna of the system 200, and f represents a numerical index of the rake fingers associated with the transmit antenna 't' of the BTS 'b'. The processor 206 may be operable to communicate the computed channel estimate values to the receiver 202 and to the interference cancellation module 210 and/or to the memory 208. The processor 206 may compute and/or select one or more interference cancellation parameter values, which control the signal interference cancellation performance of the interference cancellation module 210. The processor 206 may also be operable to communicate the interference cancellation parameter values to the interference cancellation module 210 and/or to the memory 208.

The processor 206 may also determine which BTSs are associated with a current cell 100 and which BTSs are not associated with the current cell 100. For example, the processor 206 may determine that the BTS A 102 and the BTS B 104 are associated with the current cell 100, while the BTS C 106 is not associated with the current cell 100. In an exemplary embodiment of the invention, the processor 206 may store one or more PN sequences for at least a portion of the BTSs that are associated with the current cell 100. For example, referring to FIG. 1B, the processor 206 may generate and/or store corresponding PN sequences, for example PN_A, PN_D, and PN_B, in the memory 208. The PN sequences may be generated on the fly based on the code structure utilized by the BTS and/or based on timing information associated with the BTS. The PN sequences PN_A, PN_D and PN_B may be associated with the current cell 100.

In other exemplary embodiments of the invention, the processor 206 may store PN sequences for at least a portion of the BTSs that are associated with the current cell 100 and at least a portion of the BTSs that are not associated with the current cell 100. For example, referring to FIG. 1B, the processor 206 may generate and/or store corresponding PN sequences, for example PN_A, PN_B PN_C, and PN_D in the memory 208. In general, the processor 206 may store the PN sequences for the BTSs from which a mobile communication device, for example the mobile communication device MC_2 114, may expect to receive signals and the processor 206 may store PN sequences from which the mobile communicating device may not expect to receive signals. The mobile communication device may expect to receive signals, for example common pilot channel (CPICH) signals, from a plurality of BTSs in anticipation of a soft handoff from a current service BTS to a subsequent serving BTS.

The interference cancellation module 210 may receive signals from the receiver 202, which correspond to received multipath signals. The signals received by the interference cancellation module 210 may comprise chip-level baseband signals. A plurality of chips, for example 256 chips, may be associated with a data symbol. The interference cancellation module 210 may be operable to determine a time duration that corresponds to a data symbol processing period. The interference cancellation module 210 may be operable to determine whether to perform iterations of a signal interference suppression on received chip-level baseband signals and/or symbol-level baseband signals, in accordance with an embodiment of the invention, during each data symbol processing period.

The interference cancellation module 210 may retrieve a plurality of channel estimate values, one or more PN sequences, a plurality of OVSF codes, and one or more interference cancellation parameter values from memory 208. The interference cancellation module 210 may receive timing information from the receiver 202 that corresponds to each of the fingers in the rake receiver portion of the receiver 202.

The interference cancellation module 210 may process received signals, utilizing received timing information and channel estimate values, to combine the multipath signals which are associated with corresponding fingers in the rake receiver. In various embodiments of the invention, the interface cancellation module 210 may combine the multipath signals to generate a combined chip-level signal by utilizing, for example, maximal ratio combining (MRC) and/or equal gain combining (EGC). The interference cancellation module 210 may process the combined chip-level signal, by utilizing PN sequences and OVSF codes, to determine a signal level associated with each of the plurality of OVSF codes for each of one or more selected PN sequences. In an exemplary embodiment of the invention, the plurality of OVSF codes comprises 256 Walsh codes. Each signal associated with an OVSF code may be referred herein as a corresponding user signal, although it should be noted that multiple OVSF codes may be associated with a single user and thus there is not necessarily a one-to-one correspondence between OVSF codes and users. For example, a signal associated with a $j^{th}$ OVSF code may be referred to as a $j^{th}$ user signal. Referring to FIG. 1, for example, the OSVF code WC_12 may be associated with a user signal that is transmitted from BTS A 102 to the mobile telephone MC_2 114.

The interference cancellation module 210 may compute a signal power level value and a noise power level value corresponding to each of the user signals. Based on the computed signal power level value, noise power level value, and the one or more interference cancellation parameter values, the interference cancellation module 210 may compute a weighting factor value corresponding to each user signal. The plurality of weighting factor values associated with each BTS may be represented as a weighting factor matrix, $A_{bts}$, where bts represents a numerical index value that is associated with a given BTS. In an exemplary embodiment of the invention, the weighting factor values for a given BTS may be computed as illustrated by the following equations:

$$z_j \cong \frac{\lambda x_j^2}{\lambda x_j^2 + y_j^2} \qquad [1a]$$

when $$x_j^2 > \gamma y_j^2 \qquad [1b]$$

and:

$$z_j = 0 \qquad [1c]$$

when $$x_j^2 < \gamma y_j^2 \qquad [1d]$$

where $z_j$ represents the weighting factor value for the $j^{th}$ user signal and j may be, for example, an integer from 0 to J; $x_j^2$ represents the signal power level value for the $j^{th}$ user signal, which was generated by descrambling a received signal based on a PN sequence for the given BTS and despreading the descrambled signal utilizing the OVSF code associated with the $j^{th}$ user; $y_j^2$ represents the noise power level value for the $j^{th}$ user signal, which was generated by descrambling the received signal based on the PN sequence for the given BTS and despreading the descrambled signal utilizing the OVSF code associated with the $j^{th}$ user; and $\lambda$ and $\gamma$ represent interference cancellation parameter values.

The weighting factor values $z_j$ may correspond to a signal to noise ratio (SNR) measure for the $j^{th}$ user signal. Values for $z_j$ may be within the range $0 \leq z_j^2 \leq 1$. In one regard, values of $z_j$ may be an a priori measure of confidence that a given user signal comprises valid signal energy that was transmitted by the BTS.

The interference cancellation module 210 may be operable to process chip-level signals received from one or more transmit antennas of one or more BTSs to generate corresponding interference suppressed chip-level signals based on an iterative method for interference cancellation, in accordance with an embodiment of the invention. The interference suppressed chip-level signals may be output to each corresponding rake finger. Each of the rake fingers may then process its respective interference suppressed chip-level signals.

The weighting factor value z(j) is a function of the interference cancellation parameter values $\lambda$ and $\gamma$. In various embodiments of the invention, the interference cancellation parameters $\lambda$ and $\gamma$ may comprise integer and/or non-integer values. In an exemplary embodiment of the invention, $\lambda=1$ and $\gamma=1$. The processor 206 may be operable to monitor the interference cancellation performance of the interference cancellation module 210, for example by measuring SNR values for processed signals generated by the receiver 202 based on interference suppressed chip-level signals. Accordingly, the processor 206 may be operable to adjust one or both interference cancellation parameter values $\lambda$ and $\gamma$.

Figure 3:
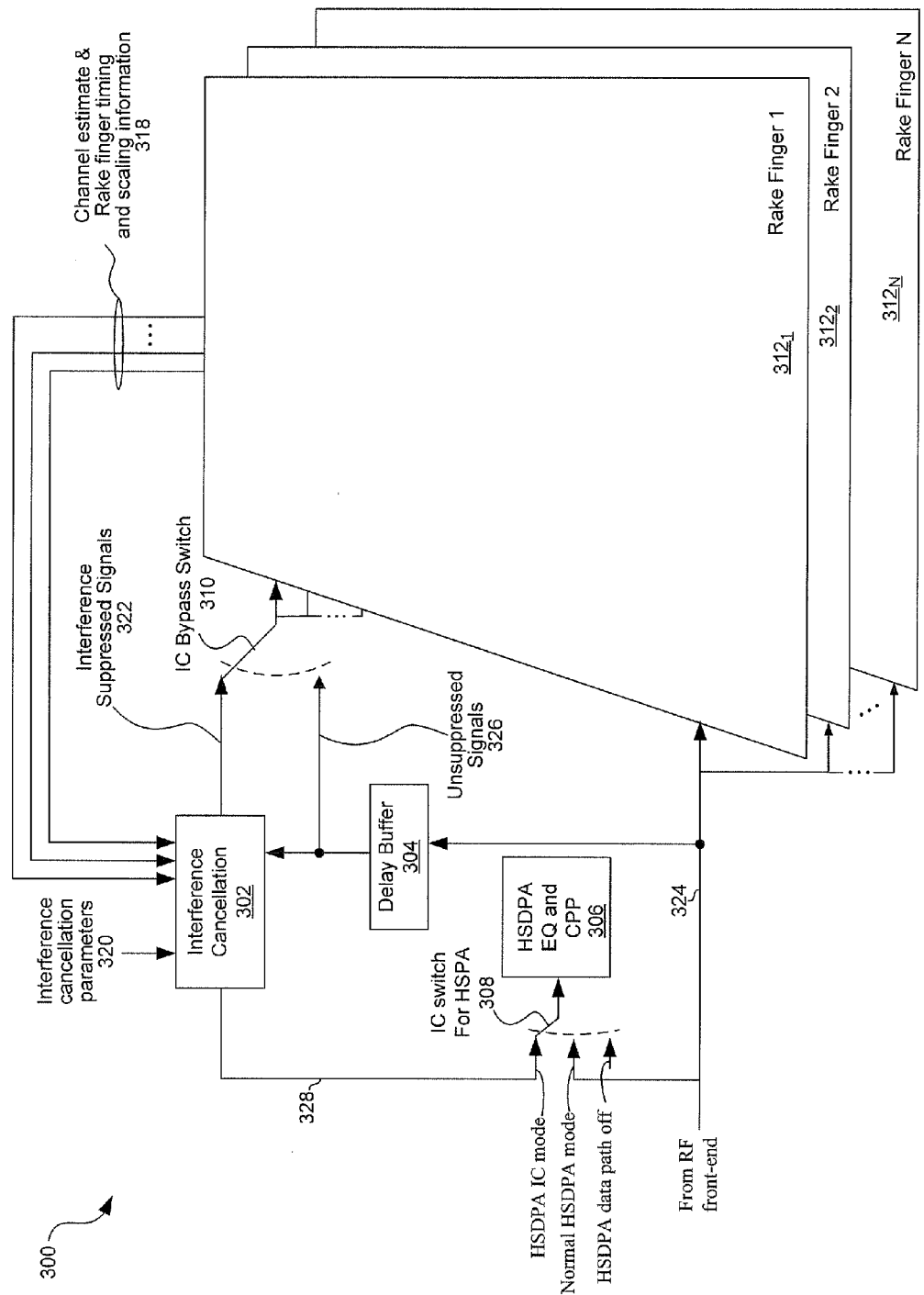
FIG. 3 is a diagram of an exemplary WCDMA receiver with interference suppression, in accordance with an embodiment of the invention.

FIG. 3 is a diagram of an exemplary WCDMA receiver with interference suppression, in accordance with an embodiment of the invention. Referring to FIG. 3, there is shown a WCDMA receiver 300 which may be substantially similar to the receiver 200. The receiver 300 may comprise an interference cancellation module 302, a delay buffer 304, a HSDPA processor 306, an HSDPA switching device 308, interference cancellation (IC) bypass switching device 310, and a plurality of rake fingers $312_1$-$312_F$. The interference cancellation module 302 may correspond to the interference cancellation module 210 as presented in FIG. 2. The rake fingers $312_1$-$312_F$ represent fingers in a rake receiver. In an exemplary embodiment of the invention, the HSDPA switching device 308 and the IC bypass switching device 310 may be configured by the processor 206.

The delay buffer 304 may comprise suitable logic, circuitry, interfaces and/or code that may be operable to receive a burst of a chip-level signal 324 as input at a given input time instant and output it as a burst of a chip-level signal 326 at a subsequent output time instant. The time duration between the input time instant and the output time instant may be referred to as a delay time duration. In an exemplary embodiment of the invention, the delay time duration corresponds to 512 chips.

The HSDPA processor 306 may comprise suitable logic, circuitry, interfaces and/or code that may be operable to provide HSDPA processing of received signals.

In operation, the HSDPA switching device 308 may comprise suitable logic, circuitry, interfaces and/or code that are operable to select an input signal to the HSDPA processor 306. As illustrated with respect to FIG. 3, the HSDPA switching device 308 is configured so that it is operable to supply an interference suppressed signal 328, generated by the interference cancellation module 302, as an input to the HSDPA processor 306. As indicated in FIG. 3, this configuration of the HSDPA switching device 308 may result in the HSDPA switching device 308 operating in a HSDPA interference cancellation (IC) mode.

The HSDPA switching device 308 may also be configured so that it is operable to supply the baseband signal 324, generated by the receiver 202, as an input to the HSDPA processor 306. As indicated in FIG. 3, this configuration of the HSDPA switching device 308 may result in the HSDPA switching device 308 operating in a normal HSDPA mode.

The HSDPA switching device 308 may also be configured such that no input signal is supplied to the HSDPA processor 306. As indicated in FIG. 3, this configuration of the HSDPA switching device 308 may result in the HSDPA switching device 308 operating in a HSDPA data path off mode.

The IC bypass switching device 310 may comprise suitable logic, circuitry, interfaces and/or code that are operable to select an input signal to the rake fingers $312_1$-$312_F$. As illustrated by FIG. 3, the IC bypass switching device 310 is configured so that it is operable to supply an interference suppressed signal 322, generated by the interference cancellation module 302, as an input to the rake fingers $312_1$-$312_F$.

The IC bypass switching device 310 may also be configured so that it is operable to supply a signal 326, which is output from the delay buffer 304, as an input to the rake fingers $312_1$-$312_F$. The signal 326 output from the delay buffer 304 may comprise a time-delayed, and possibly upsampled or down-sampled, version of the signal 324 generated by the receiver 202. As indicated in FIG. 3, the signal 326 output from the delay buffer 304 may comprise unsuppressed interference.

Each of the rake fingers $312_1$-$312_F$ may receive, as input, the chip-level baseband signal 324 generated by the receiver 202. Based on the input baseband signal 324 from the receiver 202, each of the rake fingers $312_1$-$312_F$ may generate one or more channel estimates and rake finger timing information. In various embodiments of the invention, each rake finger $312_1$-$312_F$ may generate the channel estimates and/or rake finger timing information for selected multipath signals based on CPICH data received via the input baseband signal 324 received from the receiver 202. In the case of a single receive antenna, each finger $312_f$ may be allocated and/or associated with one or more transmit antennas of a particular BTS and may generate channel estimates $w''_{b,t}(f)$, for $1 \leq t \leq T(b)$, where T(b) represents the number of transmit antennas of the BTS 'b'. The channel estimate $w''_{b,t}(f)$ may indicate the complex channel gain between the antenna 't' of BTS 'b' and the receiver 300, for the finger 'f'. In an exemplary embodiment of the invention, the receiver 300 may comprise fingers $312_1$-$312_8$, fingers $312_1$-$312_4$ may be allocated for processing signals from a first transmit-diversity BTS, and fingers $312_5$-$312_8$ may be allocated for processing signals from a second transmit-diversity BTS. In such an embodiment of the invention, the generated channel estimates may be as depicted in Table 1.

TABLE 1

| Finger | Generated Channel Estimates |
|---|---|
| $312_1$ | $w''_{1,1}(1), w''_{1,2}(1)$ |
| $312_2$ | $w''_{1,1}(2), w''_{1,2}(2)$ |
| $312_3$ | $w''_{1,1}(3), w''_{1,2}(3)$ |
| $312_4$ | $w''_{1,1}(4), w''_{1,2}(4)$ |
| $312_5$ | $w''_{2,1}(1), w''_{2,2}(1)$ |
| $312_6$ | $w''_{2,1}(2), w''_{2,2}(2)$ |
| $312_7$ | $w''_{3,1}(1), w''_{3,2}(1)$ |
| $312_8$ | $w''_{3,1}(2), w''_{3,2}(2)$ |

In another exemplary embodiment of the invention, the receiver 300 may comprise eight fingers; fingers $312_1$-$312_4$ may be allocated for processing signals from transmit-diversity BTS b=1, fingers $312_5$-$312_6$ may be allocated for processing signals from non-diversity BTS b=2, and fingers $312_7$-$312_8$ may be allocated for processing signals from non-transmit-diversity BTS b=3. The channel estimates $w''_{b,t}(f)$ for such an exemplary embodiment are depicted in table 2.

TABLE 2

| Finger | Generated Channel Estimates |
|---|---|
| $312_1$ | $w''_{1,1}(1), w''_{1,2}(1)$ |
| $312_2$ | $w''_{1,1}(2), w''_{1,2}(2)$ |
| $312_3$ | $w''_{1,1}(3), w''_{1,2}(3)$ |
| $312_4$ | $w''_{1,1}(4), w''_{1,2}(4)$ |
| $312_5$ | $w''_{2,1}(1)$ |
| $312_6$ | $w''_{2,1}(2)$ |
| $312_7$ | $w''_{3,1}(1)$ |
| $312_8$ | $w''_{3,1}(2)$ |

In instances that the receiver comprises a plurality 'R' of receive antennas, each rake finger $312_f$ may generate channel estimates $w''_{b,t,1}(f) \ldots w''_{b,t,R}(f)$, for $1 \leq t \leq T(b)$ and $1 \leq r \leq R$. The channel estimate $w''_{b,t,r}(f)$ may indicate the complex channel gain between the antenna 't' of BTS 'b' and the receive antenna 'r' of the receiver 300, for the finger 'f'. In an exemplary embodiment of the invention, the receiver 300 may comprise two receive antennas and eight fingers, fingers $312_1$-$312_4$ may be allocated for processing signals from transmit-diversity BTS b=1, fingers $312_5$-$312_8$ may be allocated for processing signals from transmit-diversity BTS b=2. In such an embodiment, the channel estimates depicted in table 3 may be generated.

TABLE 3

| Finger | Generated Channel Estimates |
| --- | --- |
| $312_1$ | $w'''_{1,1,1}(1), w'''_{1,2,1}(1), w'''_{1,1,2}(1), w'''_{1,2,2}(1)$ |
| $312_2$ | $w'''_{1,1,1}(2), w'''_{1,2,1}(2), w'''_{1,1,2}(2), w'''_{1,2,2}(2)$ |
| $312_3$ | $w'''_{1,1,1}(3), w'''_{1,2,1}(3), w'''_{1,1,2}(3), w'''_{1,2,2}(3)$ |
| $312_4$ | $w'''_{1,1,1}(4), w'''_{1,2,1}(4), w'''_{1,1,2}(4), w'''_{1,2,2}(4)$ |
| $312_5$ | $w'''_{2,1,1}(1), w'''_{2,2,1}(1), w'''_{2,1,2}(1), w'''_{2,2,2}(1)$ |
| $312_6$ | $w'''_{2,1,1}(2), w'''_{2,2,1}(2), w'''_{2,1,2}(2), w'''_{2,2,2}(2)$ |
| $312_7$ | $w'''_{2,1,1}(3), w'''_{2,2,1}(3), w'''_{2,1,2}(3), w'''_{2,2,2}(3)$ |
| $312_8$ | $w'''_{2,1,1}(4), w'''_{2,2,1}(4), w'''_{2,1,2}(4), w'''_{2,2,2}(4)$ |

Each rake finger $312_1$-$312_F$ may communicate, as one or more signals 318, its respective channel estimates, rake finger timing information, scrambling codes associated with one or more BTSs, and/or other information to the interference cancellation module 302.

In various embodiments of the invention, the interference cancellation module 302 may receive chip-level signals 326 from the delay buffer 304. Based on the channel estimates, rake finger timing, and/or other information communicated via the signal(s) 318, the interference cancellation module 302 may select individual multipath signals from the chip-level signals 326 received via the delay buffer 304. Based on the interference cancellation parameters 320, which may be as described with respect to FIG. 2, the interference cancellation module 302 may process the received chip-level multipath signal 326 utilizing an iterative method for interference cancellation, in accordance with an embodiment of the invention.

The chip-level signals 326 received from the delay buffer 304 may comprise a plurality of multipath signals received via one or more receive antennas from one or more transmit antennas of one or more BTSs. The interference cancellation module 302 may be configurable to assign signal processing resources to perform the iterative method of interference cancellation for selected multipath signals. The processor 206 may configure the interference cancellation module 302 to receive multipath signals from one or more transmit antennas of one or more BTSs. The processor 206 may configure the interference cancellation module 302 for receive diversity.

The interference cancellation module 302 may receive interference cancellation parameters 320 from the processor 206 and/or from the memory 208. In an exemplary embodiment of the invention, the interference cancellation module 302 may generate and/or retrieve PN sequences and/or OVSF codes from the memory 208. The interference cancellation module 302 may retrieve and/or generate a PN sequence for each of the one or more transmit antennas of the one or more BTSs from which the interference cancellation module 302 is configured to attempt to receive a signal.

In various embodiments of the invention in which the receiver 202 utilizes a plurality of receiving antennas and/or receives data from a plurality of transmit antennas, data received via the symbol-level signals corresponding to the plurality of receiving antennas and/or transmit antennas may be decoded by utilizing various diversity decoding methods. Various embodiments of the invention may also be practiced when the receiver 202 is utilized in a multiple input multiple output (MIMO) communication system. In instances where the receiver 202 is utilized in a MIMO communication system, data received via the symbol-level signals, received via the plurality of receiving antennas, may be decoded by utilizing various MIMO decoding and/or diversity decoding methods.

Figure 4:
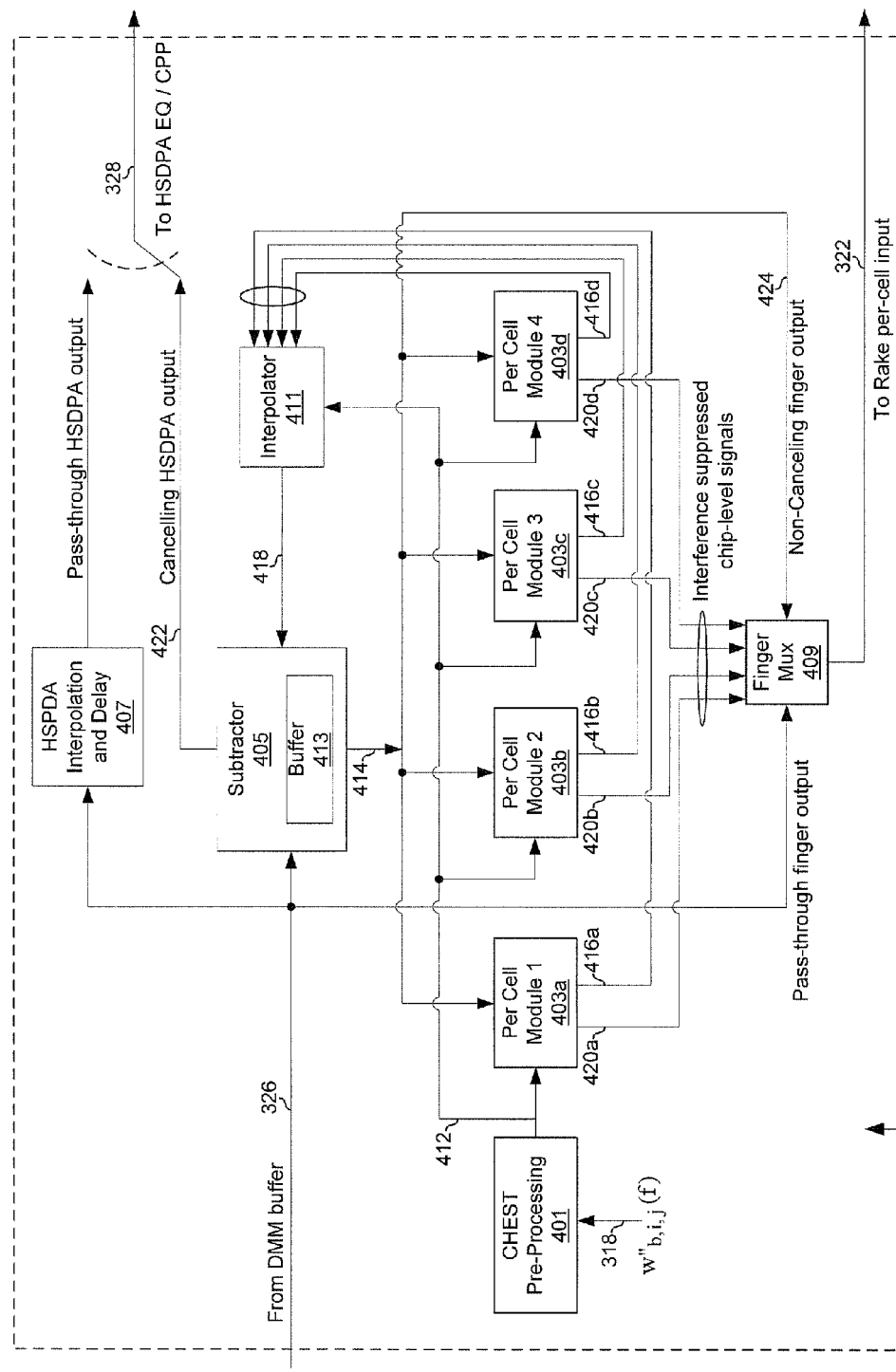
FIG. 4 is a module diagram illustrating an exemplary interference cancellation module, in accordance with an embodiment of the invention.

FIG. 4 is a module diagram illustrating an exemplary interference cancellation module, in accordance with an embodiment of the invention. Referring to FIG. 4, there is shown an interference cancellation module 302 comprising a channel estimate (CHEST) pre-processing module 401, interference cancellation per-cell modules 403A, 403B, 403C, 403D, an subtractor 405, an HSDPA interpolation and delay module 407, a finger MUX 409, and an interpolator 411.

The CHEST pre-processing module 401 may comprise suitable circuitry, logic, interfaces, and/or code that may be operable to normalize and/or orthogonalize channel estimate information input as signal 412 to the Per-Cell Modules 403 and the interpolator 411. The normalization may be based on channel estimate and rake finger timing and scaling information 318 received from the rake fingers $312_1$-$312_K$. Additional details of the CHEST pre-processing module 401 are described below with respect to FIGS. 5-8.

The subtractor 405 may comprise suitable circuitry, logic, interfaces, and/or code that may be operable to subtract estimated signals from received signals as part of the generation of an interference suppressed version of the received signals. The subtractor 405 may be operable to receive, as inputs, signals generated by the Per-Cell modules 403A-403D that may be interpolated by the interpolator 411, as well as 256-chip bursts of the delayed received signal 326 from the delay buffer 304.

The HSDPA interpolation and delay module 407 may comprise suitable circuitry, logic, interfaces, and/or code that may be operable to provide a bypass path for signals received from the delay buffer 304. The HSDPA interpolation and delay module 407 may, for example, interpolate cx2 samples to cx16 samples, and may introduce a delay that equals the delay of the interference cancellation module 302 when operating in interference cancellation mode.

The finger MUX 409 may comprise suitable circuitry, logic, interfaces, and/or code that may be operable to select from the plurality of signals 420 generated by the Per-Cell modules 403A-403D, the input signal from the delay buffer 304, or a non-cancelling finger input 424. In this manner, the finger MUX 409 may enable a pass-through mode, an interference cancelling mode, or a non-cancelling mode.

The interpolator 411 may comprise suitable circuitry, logic, interfaces, and/or code that may be operable to interpolate a received signal, such as a cx1 signal and output a cx2 signal, for example.

The Per-Cell modules 403A-403D may each comprise suitable circuitry, logic, interfaces, and/or code that may be operable to generate an estimate of a multi-user (e.g., WCDMA) and/or multipath chip-level signal. Each of the Per-Cell modules 403A-403D may process bursts—256-chip bursts, for example—of a received multi-user and/or multi-path signal. A received signal 326 processed by each of the modules 403A-403D may comprise information received on one or more RF channels via one or more receive antennas from one or more transmit antennas of one or more BTSs, each BTS having up to J users. In this regard, each of the modules 403A-403D may be allocated for processing signals from a particular transmit antenna of a particular BTS, where the signals from a particular transmit antenna may be received over one or more RF channels via each of one or more receive antennas. Accordingly, each of the modules 403A-403D may be operable to provide compensation for multipath effects, suppress interference from BTSs other than an associated or "serving" BTS, and suppress interference between users of the associated or "serving" BTS.

In an exemplary embodiment of the invention, the four Per-Cell modules 403A-403D may be operable to cancel and/or suppress interference from four non-diversity transmit (Tx) BTSs, two Tx diversity BTSs, one Tx diversity BTS and two non-Tx diversity BTSs, one Tx diversity BTS with two scrambling codes per antenna, and/or one non Tx-diversity BTS that has four scrambling codes. However, the invention need not be so limited, and may support any number of cells depending on the number of Per-Cell modules integrated in the interference cancellation module.

In operation, each one of the per-cell modules 403a-403d may be allocated for processing signals from a particular transmit antenna 't' of a particular BTS 'b'. Accordingly, each one of the per-cell modules 403a-403d that processes signals from an antenna 't' of a BTS 'b' may receive a set of normalized channel estimates $w_{b,t,1}(1) \ldots w_{b,t,R}(F(b))$ from the CHEST pre-processing module 401. In this regard, the CHEST pre-processing module 401 may generate the set of normalized channel estimates $w_{b,t,1}(1) \ldots w_{b,t,R}(F(b))$ by processing the set of channel estimates $w''_{b,t,1}(1) \ldots w''_{b,t,R}(F(b))$ received from the rake fingers $312_1$-$312_{F(b)}$) allocated to processing signals from the antenna 't' of BTS 'b'. Processing of the set of channel estimates $w''_{b,t,1}(1) \ldots w''_{b,t,R}(F(b))$ may comprise orthogonalization and/or normalization.

Figure 5:
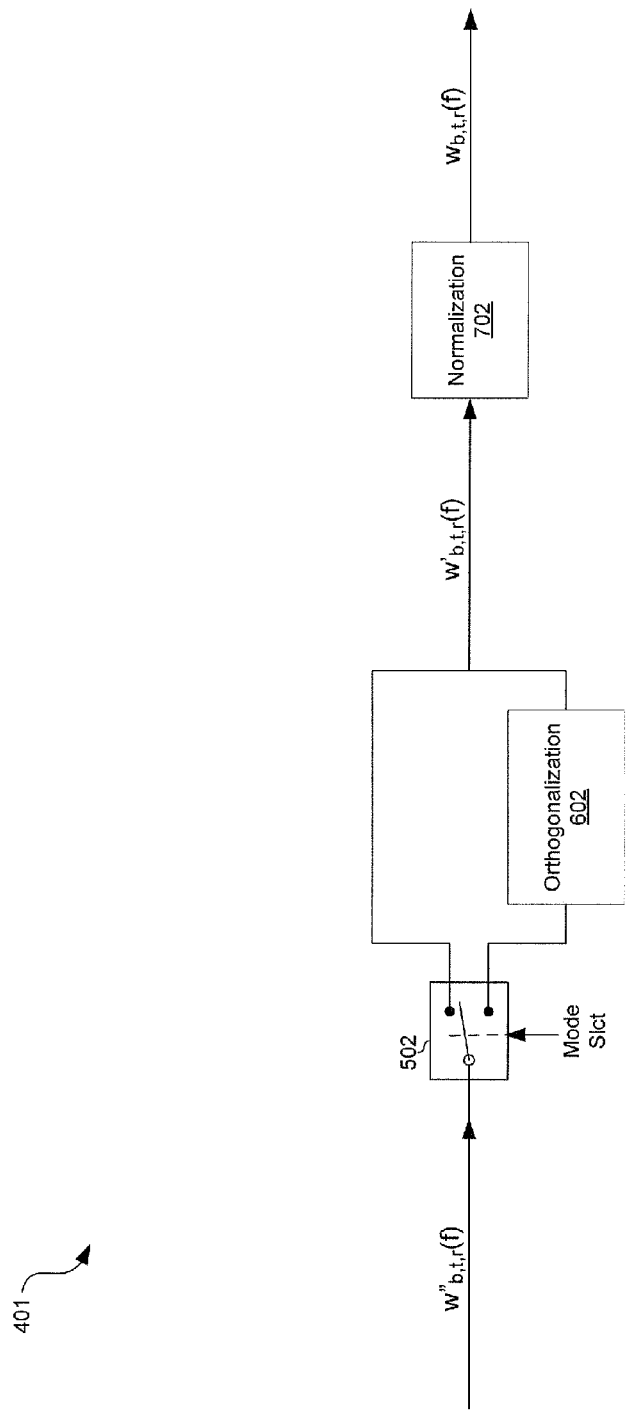
FIG. 5 is a diagram illustrating generation of normalized channel estimates, in accordance with an embodiment of the invention.

FIG. 5 is a diagram illustrating generation of normalized channel estimates, in accordance with an embodiment of the invention. Referring to FIG. 5 there is shown an exemplary CHEST pre-processing module 401 comprising a switching element 502, an orthogonalization module 602, and a normalization module 702.

The switching module 502 may comprise suitable logic, circuitry, interfaces, and/or code that may be configurable such that channel estimates either bypass the orthogonalization module 602 or are processed by the orthogonalization module 602. The switching module 502 may be controlled by one or more control signals from, for example, the processor 206 (FIG. 2).

The orthogonalization module 602 may comprise suitable logic, circuitry, interfaces, and/or code that may be operable to determine a measure of correlation between a set of channel estimates from a first antenna of a transmit-diversity BTS and a set of channel estimates from a second antenna of the transmit-diversity BTS. Based on the measure of correlation, the orthogonalization module 602 may set each of the channel estimates from the second antenna to zero. That is, signals from the second antenna may be disregarded or ignored for interference cancellation processing. Alternatively, based on the measure of correlation, the orthogonalization module 602 may rotate the set of channel estimates from the second transmit antenna such that the rotated set of channel estimates is orthogonal to the set of channel estimates from the first transmit antenna. In this regard, the set of channel estimates from the first transmit antenna may be represented as a first vector having F(b) elements and the set of channel estimates from the second transmit antenna may be represented as a second vector having F(b) elements. Accordingly, the second vector may be rotated such that the rotated vector is orthogonal to the first vector.

The normalization module 702 may comprise suitable logic, circuitry, interfaces, and/or code that may be operable to normalize channel estimates with respect to total power from a particular BTS or a particular transmit antenna of a BTS received via one or more signal paths. In this regard, in instances that signals are received from a particular BTS or particular transmit antenna of a BTS via a single path, the channel estimates may be set to one. In instances that signals from a particular BTS or particular transmit antenna are received over a single path, then the channel estimates may be normalized to values between 0 and 1. In instances that signals from a particular BTS or particular transmit antenna are received over multiple paths then the channel estimates may be normalized to values between 0 and 1.

The normalization may ensure that the estimated interference signal to be subtracted from a received signal is appropriately scaled. If the interference signal is too large, the subtracted interference signal may be more than the actual interference; this may have the undesired effect of effectively introduce interference. Conversely, if the interference signal is too small, the subtracted interference signal only represents a portion of the interference; this may have the undesired effect of interference remaining in the received signal after cancellation.

In operation, the switching module 502 may be dynamically configured as channel estimates are received from the fingers $312_1$-$312_F$. In this regard, for estimates received from a finger $312_f$ associated with a non-transmit-diversity BTS, the switching module 502 may route the channel estimates $w''_{b,t,r}(f)$ to the normalization module 702. Conversely, for estimates received from a finger $312_f$ associated with a transmit-diversity BTS, the switching module 502 may route the channel estimates $w''_{b,t,r}(f)$ to the orthogonalization module 602.

In an exemplary embodiment of the invention, fingers $312_1$-$312_{F(b)}$ may be allocated for processing signals from a non-transmit-diversity BTS 'b'. In such an embodiment, the set of channel estimates $w''_{b,1,1}(1) \ldots w''_{b,1,R}(F(b))$ may bypass the orthogonalization module 602 and the set of normalized channel estimates $w_{b,1,1}(1) \ldots w_{b,1,R}(F(b))$ may be generated by normalizing the set of channel estimates $w''_{b,1,1}(1) \ldots w''_{b,1,R}(F(b))$ with respect to the total signal energy received via the rake fingers $312_1$-$312_{F(b)}$. The set of normalized channel estimates $w_{b,1,1}(1) \ldots w''_{b,1,R}(F(b))$ may be communicated to the one of the per cell modules 403a-403d allocated for processing signals from the BTS 'b'. The per-cell module may utilize the normalized channel estimates for cancelling interference in signals received from the BTS 'b'. Channel estimates may be processed in this manner for each non-transmit-diversity BTS for which there is a per-cell module 403 and one or more fingers 312 that are allocated.

In an exemplary embodiment of the invention, fingers $312_1$-$312_{F(b)}$ may be allocated for processing signals from a transmit-diversity BTS 'b'. In such an embodiment, the two sets of channel estimates $w''_{b,1,1}(1) \ldots w''_{b,1,R}(F(b))$ and $w''_{b,2,1}(1) \ldots w''_{b,2,R}(F(b))$ may be routed to the orthogonalization module 602. The orthogonalization module 602 may be operable to generate corresponding sets of channel estimates $w'_{b,1,1}(1) \ldots w'_{b,1,R}(F(b))$ and $w'_{b,2,1}(1) \ldots w'_{b,2,R}(F(b))$ which may be conveyed to the normalization module 702, where each set of channel estimates may be processed in the same manner as a set of channel estimates from a non-transmit-diversity BTS.

The orthogonalization module 602 may be operable to determine a measure of correlation between the set of channel estimates $w''_{b,1,1}(1) \ldots w''_{b,1,R}(F(b))$ and the set of channel estimates $w''_{b,2,1}(1) \ldots w''_{b,2,R}(F(b))$. In instances that the measure of correlation is above a threshold, the orthogonalization module 602 may generate a set of channel estimates $w'_{b,2,1}(1) \ldots w'_{b,2,R}(F(b))$ in which all estimates are equal to zero. In this regard, the zeroed-out set channel estimates $w''_{b,2,1}(1) \ldots w''_{b,2,R}(F(b))$ may not be utilized for interference cancellation. Accordingly, the one of the per-cell modules 403a-403d allocated for processing signals from antenna 2 of BTS 'b' may be disabled and/or not utilized for interference cancellation. In instances that the measure of correlation is below a threshold, the orthogonalization module 602 may be operable to process the two sets of channel estimates $w''_{b,1,1}(1) \ldots w''_{b,1,R}(F(b))$ and $w''_{b,2,1}(1) \ldots w''_{b,2,R}(F(b))$ to generate two sets of channel estimates, $w'_{b,1,1}(1) \ldots w'_{b,1,R}(F(b))$ and $w'_{b,2,1}(1) \ldots w'_{b,2,R}(F(b))$, that are orthogonal to each other.

The normalization module 702 may then normalize $w'_{b,1,1}(1) \ldots w'_{b,1,R}(F(b))$ and $w'_{b,2,1}(1) \ldots w'_{b,2,R}(F(b))$ to generate two sets of normalized channel estimates, $w_{b,1,1}(1) \ldots w_{b,1,R}(F(b))$ and $w_{b,2,1}(1) \ldots w_{b,2,R}(F(b))$. The set of normalized channel estimates $w_{b,1,1}(1) \ldots w_{b,1,R}(F(b))$ may be communicated to the one of the per cell modules 403a-403d allocated for processing signals from antenna 1 of the BTS 'b'. The set of normalized channel estimates $w_{b,2,1}(1) \ldots w_{b,2,R}(F(b))$ may be communicated to the one of the per cell modules 403a-403d allocated for processing signals from antenna 2 of the BTS 'b'.

Exemplary pseudocode illustrating operation of an exemplary orthogonalization module 602 is as follows:

```
for b =1:B // loop BTSs for which there is at least one per-cell module allocated
    Delta=Cal1=Cal2=P1=P2=P3=0; // initialize variables
    if block_en==true // if the rotation block is enabled
        if F(b)==1
            // bypass the whole rotation part for cell b
        else
            for t=1:T(b) // loop through the transmit antennas of the BTS b
                for r=1:R // loop through all the receive antennas of the receiver
                    for f=1:F(b) // loop through fingers allocated to BTS b
                        if t==1 // for the first transmit antenna
                            w'_{b,1,r}(f) = w''_{b,1,r}(f) //bypass orthogonalization for ant. 1
                        else
                            P1 = P1 + w''_{b,1,r}^H(f) w''_{b,1,r}(f) // power of ant. 1 of BTS b
                            P2 = P2 + w''_{b,2,r}^H(f) w''_{b,2,r}(f) // power of ant. 2 of BTS b
                            P3 = P3 + w''_{b,1,r}^H(f) w''_{b,2,r}(f) // Inner product
                        end // if t==1
                    end // for f=1:F(b)
                end   // for r=1:R
            end // for f=1:T(b)
            if P1==0 // if there is no signal energy received from the first antenna
                w'_{b,2,r}(f) = w''_{b,2,r}(f) // bypass orthogonalization for ant. 2
            else
                Cal1=P1*P2*Rth;   //Rth is the correlation threshold
                Cal2=P3.r*P3.r+P3.i*P3.i; //power of P3
                if(Cal2>Cal1) // If measure of correlation is above a threshold
                    w'_{b,2,r}(f) = 0 for all b,r // zero out estimates from antenna 2
                else
                    β = P3/P1
                    for r=1:R // loop over all receive antennas
                        for f=1:F(b) // loop through fingers allocated to the BTS b
                            Delta = β*w''_{b,1,r}(f);
                            w'_{b,2,r}(f) = w''_{b,2,r}(f);
                        end // for f=1:F(b)
                    end // for r=1:R
                end //if(Cal2>Cal1)
            end //if P1==0
        end // F(b)==1
    else // rotation block disabled
        w'_{b,t,r}(f)= w''_{b,t,r}(f) for all t, r, f // bypass everything for base station b
    end // if block_en==true
end // for b =1:B
```

Exemplary pseudocode illustrating operation of an exemplary normalization module 602 is as follows:

```
P(t) = 0 for all t; // initialize
for b=1:B // loop BTSs for which there is at least one per-cell module allocated
    if F(b)==1 // if there is only one path for BTS b
        for r=1:R // loop through all the receive antennas of the receiver
            w_{b,1,r}(1) = 1
            w_{b,2,r}(1) = 0
        end
    else
        for t=1:T(b) // loop through the transmit antennas of the BTS b
            for f=1:F(b) // loop through fingers allocated to BTS b
                for r=1:R // loop through all the receive antennas of the receiver
                    P(t) = sqrt(Re{w'_{b,t,r}(f)}^2+
                        Im{w'_{b,t,r}(f)})^2+P(t)^2 )
                end
            end
            if (P(t)==0)
                w_{b,t,r}(f) = 0, for all f,r
            else
                w_{b,t,r}(f) = w'_{b,t,r}(f) / P(t) for all f,r
            end
        end
    end
end
```

Figure 6A:
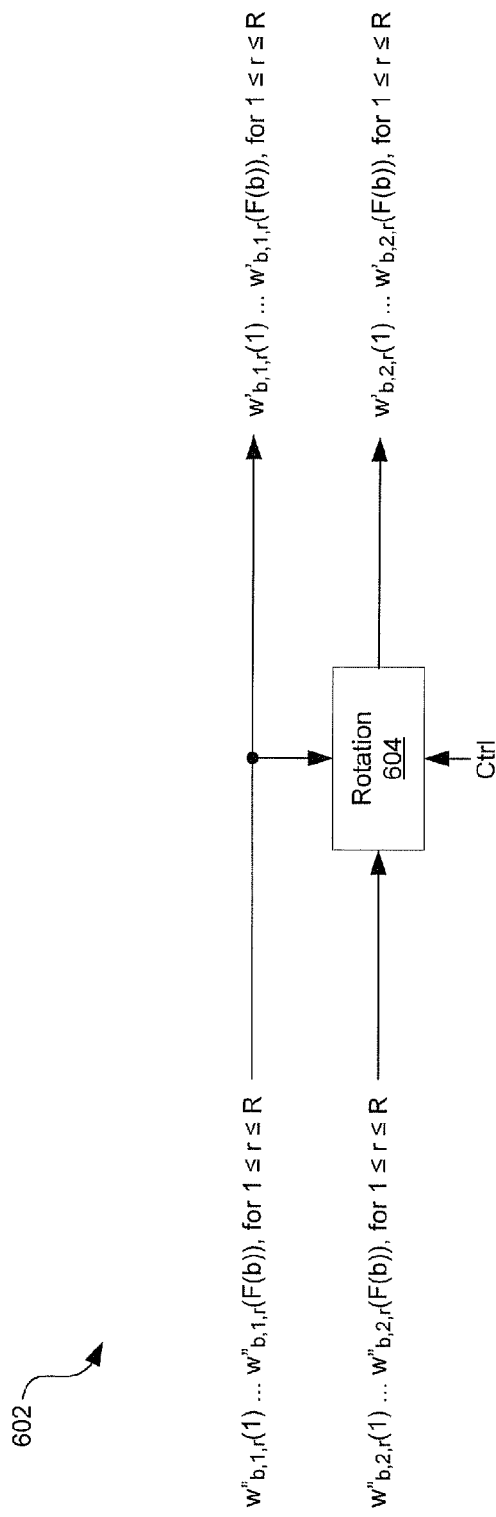
FIG. 6A is a is a diagram that illustrates exemplary orthogonalization of channel estimates received from a transmit diversity antenna, in accordance with an embodiment of the invention.

FIG. 6A is a diagram that illustrates exemplary orthogonalization of channel estimates received from a transmit diversity antenna, in accordance with an embodiment of the invention. Referring to FIG. 6A there is shown two sets of input channel estimates $w''_{b,1,1}(1) \ldots w''_{b,1,R}(F(b))$ and $w''_{b,2,1}(1) \ldots w''_{b,2,R}(F(b))$, and two sets of output channel estimates $w'_{b,1,1}(1) \ldots w'_{b,1,R}(F(b))$ and $w'_{b,2,1}(1) \ldots w'_{b,2,R}(F(b))$.

In operation, the input set of channel estimates corresponding to a first transmit antenna may bypass the rotation module 604. That is, the channel estimates $w'_{b,1,1}(1) \ldots w'_{b,1,R}(F(b))$ may be the same as the channel estimates $w''_{b,1,1}(1) \ldots w''_{b,1,R}(F(b))$, but renamed for convenience of illustration. On the other hand, the input channel estimates corresponding to a second transmit antenna are processed by the rotation module 604. That is, when the rotation module is enabled, the channel estimates $w'_{b,2,1}(1) \ldots w'_{b,2,R}(F(b))$ are a modified version of the channel estimates $w''_{b,2,1}(1) \ldots w''_{b,2,R}(F(b))$.

In instances that the rotation module 604 is disabled, both sets of input channel estimates may pass directly to the output channel estimates. Conversely, in instances that the rotation module 604 is enabled, the output of the rotation module 604 may depend on a measure of correlation between the two sets of input channel estimates. In this regard, in instances that the correlation between the two sets of input channel estimates are highly correlated (i.e. a measure of correlation between them is above a threshold), then the rotation module 604 may output all zero values for the set $w'_{b,2,1}(1) \ldots w'_{b,2,R}(F(b))$. That is, signals from the second antenna may be disregarded and/or not utilized for interference suppression. On the other hand, in instances that the two sets of input channel estimates are not highly correlated, then the set of input channel estimates $w''_{b,2,1}(1) \ldots w''_{b,2,R}(F(b))$ may be processed to generate a set of channel estimates $w'_{b,2,1}(1) \ldots w'_{b,2,R}(F(b))$ that is orthogonal to the set $w'_{b,1,1}(1) \ldots w'_{b,1,R}(F(b))$.

Although FIG. 6A depicts modifying channel estimates corresponding to a second antenna while channel estimates from a first antenna bypass such modification, the invention is not so limited. For example, channel estimates corresponding to a first antenna may be modified while channel estimates corresponding to a second antenna bypass the modification. Similarly, channel estimates corresponding to both antennas may be modified. In this regard, how the channel estimates are modified is not important so long as the result is sets of channel estimates that are orthogonal to one another.

Figure 6B:
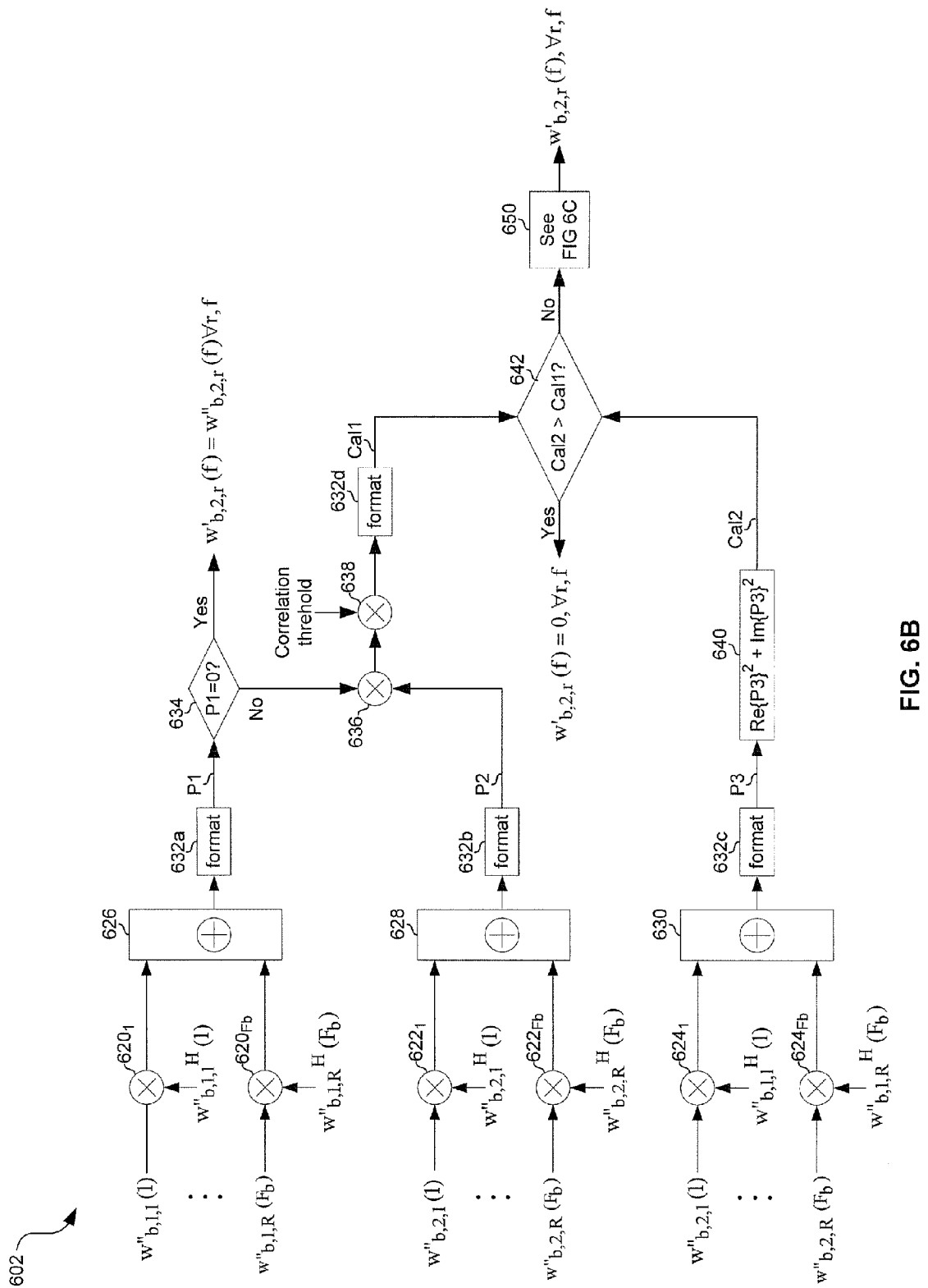
FIGS. 6B and 6C are diagrams that illustrate exemplary implementation of an orthogonalization module, in accordance with an embodiment of the invention.
Figure 6C:
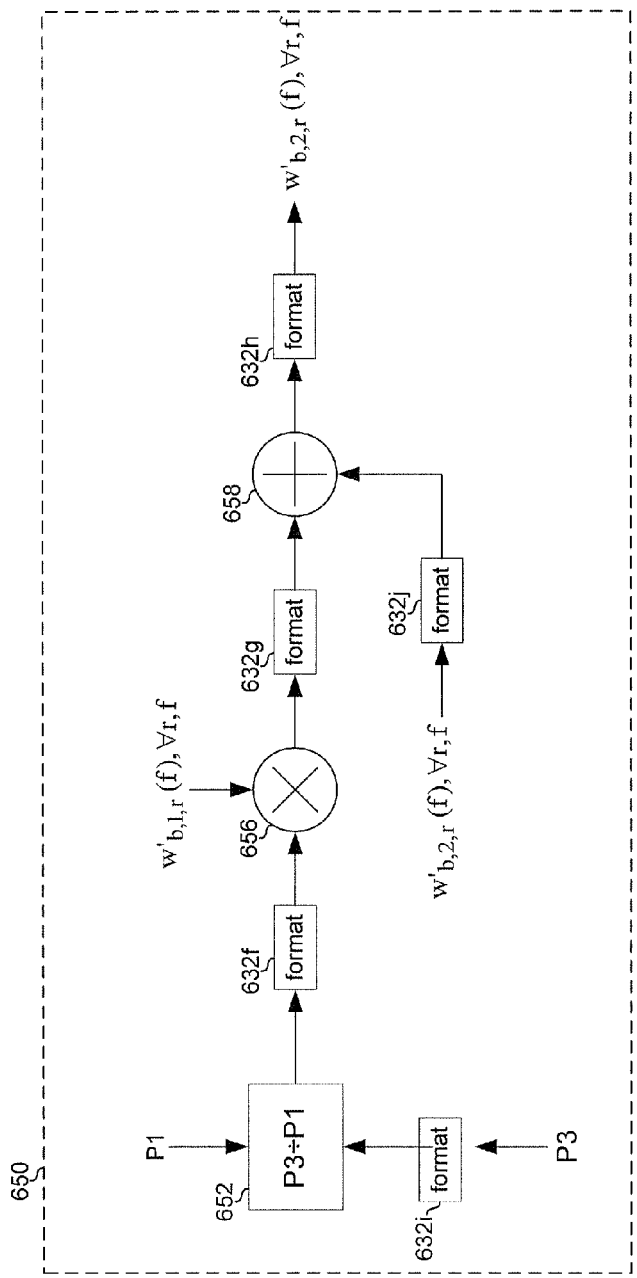

FIG. 6B and FIG. 6C are diagrams that illustrate exemplary implementation of an orthogonalization module, in accordance with an embodiment of the invention. In this regard, FIGS. 6B and 6C may illustrate pictorially what is described above in the exemplary pseudocode for the orthogonalization module 602.

Referring to FIG. 6B, the multipliers $620_1\text{-}620_{FB}$, the adder 626, and the formatting module 632a may generate P1. Similarly, the multipliers $622_1\text{-}622_{FB}$, the adder 628, and the formatting module 632b may generate P2. The multipliers $624_1\text{-}624_{FB}$, the adder 630, and the formatting module 632c may generate P3. The module 640 may generate Cal2 by determining the magnitude, or an approximation of the magnitude, of P3.

The decision block 634 may determine whether P1 is equal to zero. In instances that P1 is equal to zero, then the set of channel estimates the set of channel estimates $w''_{b,2,r}(f)$ may pass through to become $w'_{b,2,r}(f)$. That is, orthogonalization may be bypassed.

In instances that P1 is not equal to zero, multiplier 636 may multiply P1 and P2, multiplier 638 may multiple the output of multiplier 636 by a correlation threshold to generate Cal1. The correlation threshold may be programmed via, for example, firmware. The comparison block 642 may determine whether Cal2 is greater than Cal1. In instances that Cal 2 is greater, then $w'_{b,2,r}(f)$ may be set to zero for all r and f associated with the BTS 'b'. In instances that Cal2 is not greater, then, referring now to FIG. 6C, P3 may be divided by P1 in block 652. The output of block 652 may be multiplied by $w'_{b,1,r}(f)$, for all r and f associated with the BTS 'b', via the multiplier 656. The output of multiplier 565 may be multiplied by a formatted version of $w'_{b,2,r}(f)$, for all r and F associated with BTS 'b', via the multiplier 658. The output of the multipler 658 may be the modified set of channel estimates $w'_{b,2,r}(f)$.

Also shown in FIGS. 6B and 6c are various formatting modules 632. The formatting module 632 may, for example, adjust a bit-width, left-shift, right-shift, or adjust a sample rate of a signal. One or more of the formatting modules 632 may be optional.

It should be noted that FIG. 6B is a functional block diagram that does not necessarily depict a hardware configuration of the orthogonalization module 602. In this regard, various operations associated with orthogonalization may be performed sequentially by shared hardware and/or in parallel by separate hardware modules or blocks and the invention is not limited to any particular hardware implementation.

Figure 7:
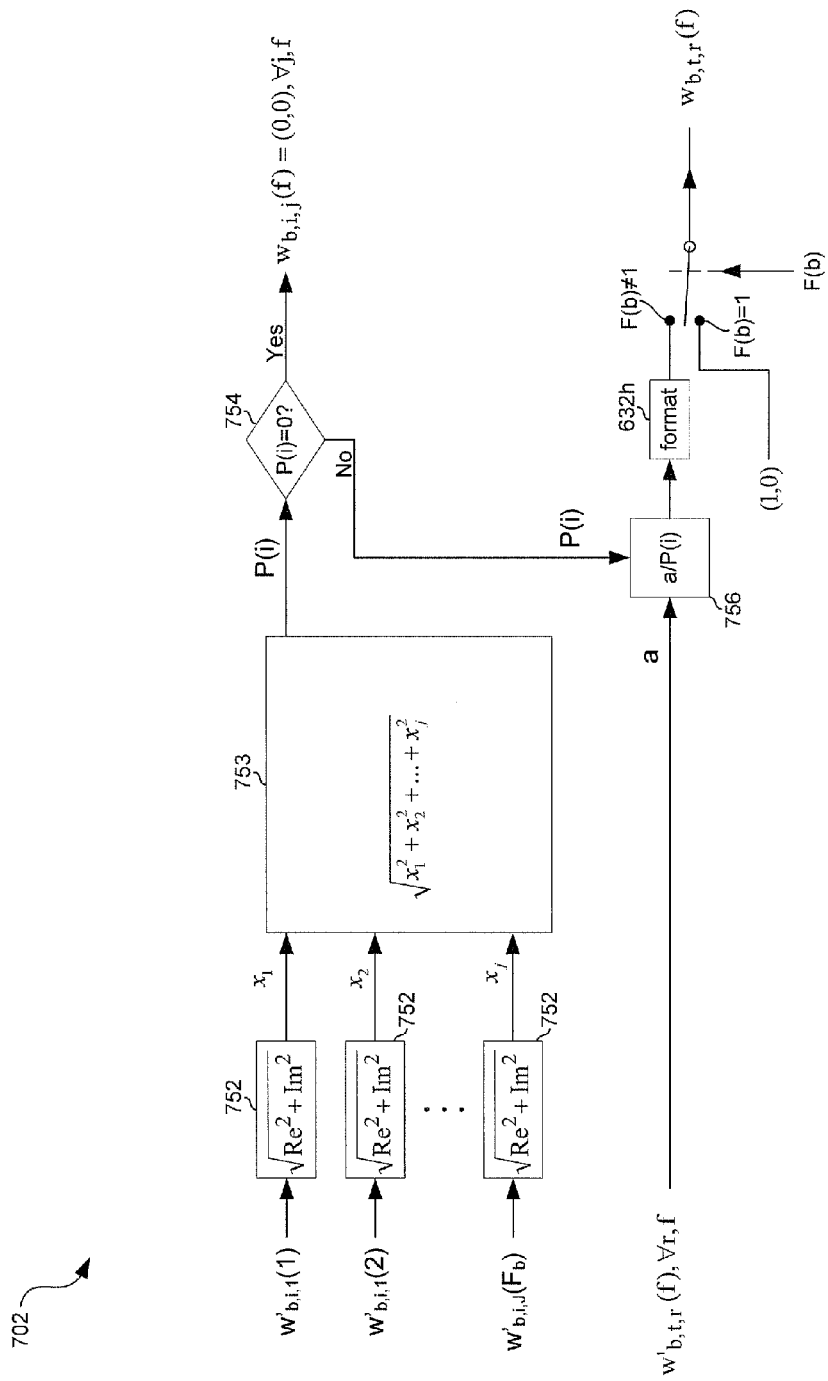
FIG. 7 is a diagram that illustrates an exemplary implementation of a normalization module, in accordance with an embodiment of the invention.

FIG. 7 is a diagram that illustrates an exemplary implementation of a normalization module, in accordance with an embodiment of the invention. In this regard, FIG. 7 may illustrate pictorially what is described above in the exemplary pseudocode for the normalization module 702. Referring to FIG. 7, the modules 752 and 753 may generate pseudo-amplitude values to generate P(i). The decision block 754 may determine whether P(i) is equal to 0, for all i. In instances that P(i) is equal to 0 for all i, then the set of channel estimates $w_{b,t,r}(f)$ may be set to 0 for all r and f associated with BTS 'b'. In instances that P(i) is not equal to 0 for all i, then 'a'—generated by left-shifting $w'_{b,t,r}(f)$—may be divided by P(i) in block 756. If there is more than one finger associated with the BTS then the output of the block 756 may be selected as the set of channel estimates $w_{b,t,r}(f)$ for all t, r, and f associated with BTS 'b'. In instances that there is only one finger associated with BTS 'b,' then $w_{b,t,r}(f)$ may be set to 1 for all t, r, and f associated with BTS 'b'.

Figure 8:
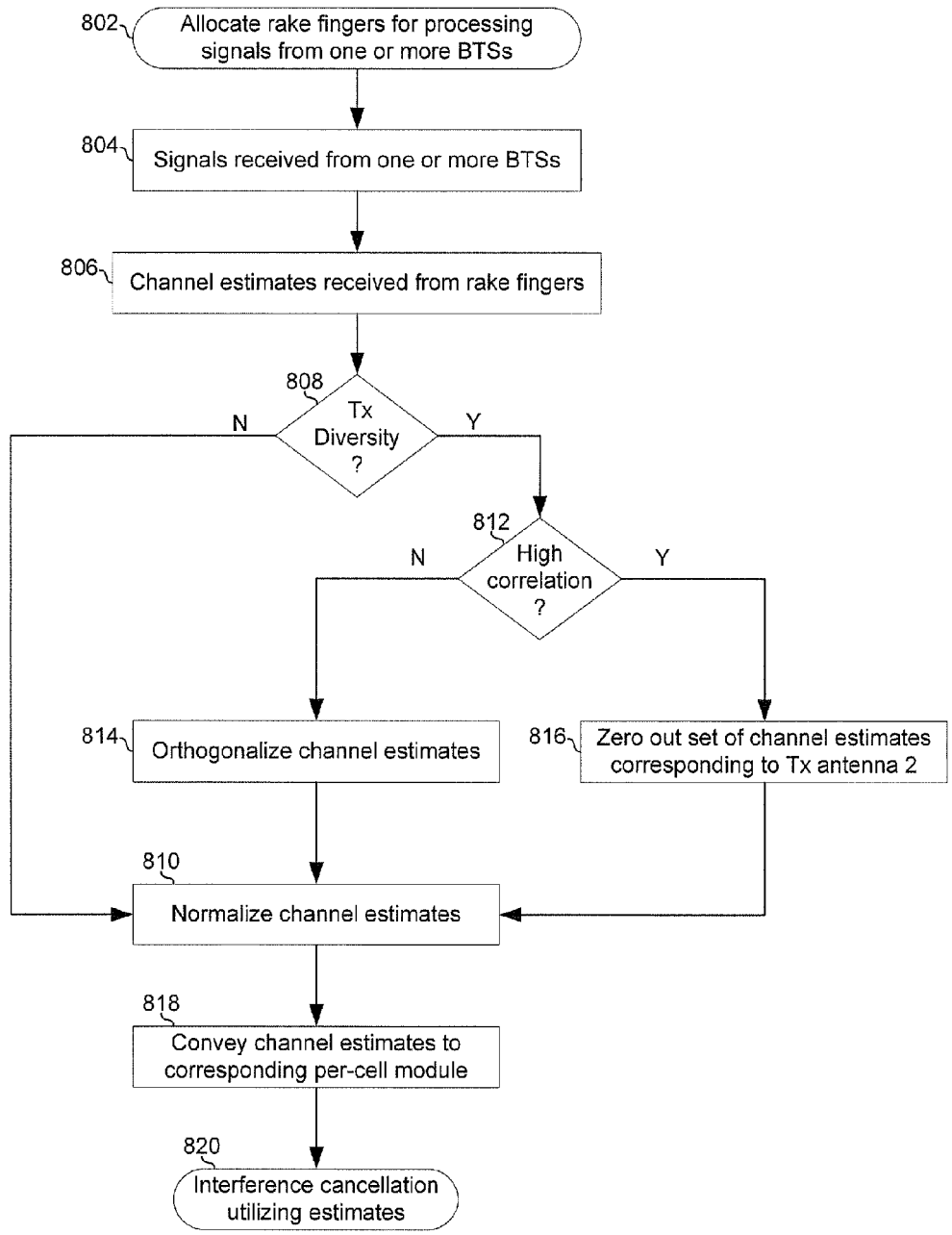
FIG. 8 is a flowchart illustrating exemplary steps for interference cancellation in a communication system that utilizes transmit diversity, in accordance with an embodiment of the invention.

FIG. 8 is a flowchart illustrating exemplary steps for interference cancellation in a communication system that utilizes transmit diversity, in accordance with an embodiment of the invention. Referring to FIG. 8, the exemplary steps may begin with step 802 when the rake fingers $312_1\text{-}314_F$ may be allocated among one or more BTSs. That is, each finger may be associated with a particular BTS. In step 804, wireless signals may be received by the receiver 300 from the one or more BTSs. In step 806, each finger may begin generating channel estimates that estimate the complex channel gain from the one or more transmit antennas of the associated BTS to a particular receive antenna of the receiver 300. In step 808, for each finger, it may be determined whether the associated BTS utilizes transmit diversity. For fingers that are associated with a transmit diversity BTS, the exemplary steps may advance to step 812.

In step 812, for each finger associated with a transmit-diversity BTS, it may be determined whether a measure of correlation between a set of channel estimates for a first transmit antenna of the associated BTS and a set of channel estimates for a second transmit antenna of the associated BTS is above a threshold. In instances that the measure of correlation is above a threshold, the exemplary steps may advance to step 814. In step 814, for each finger associated with a transmit-diversity BTS, the second set of channel estimates generated by the finger may be processed such that the result is orthogonal to the first set of channel estimates generated by the finger.

In step 810, for each finger, the channel estimates corresponding to the finger may be normalized. For channel estimates corresponding to a finger f, the normalization may be done with respect to the total energy received by all fingers associated with the same BTS.

In step 818, each set of normalized estimate may be conveyed to a corresponding per-cell module. In step 820, the per-cell modules may perform interference cancellation utilizing the normalized channel estimates.

Returning to step 812, in instances that the measure of correlation is above a threshold, the exemplary steps may advance to step 816 in which the channel estimates to be output to the corresponding per cell module may be set to zero. In this regard, a per-cell module that receives the zeroed out channel estimates may not cancel interference. In this manner, aspects of the invention may prevent double cancellation of the same interference.

Returning to step 808, for channel estimates from fingers associated with a non-transmit-diversity BTS, the exemplary steps may advance to the step 810.

Aspects of a method and system for channel estimation for interference suppression are provided. In an exemplary embodiment of the invention, one or more circuits and/or processors of the CHEST pre-processing module 401 may generate and/or receive a first set of channel estimates $w''_{b,1,r}(1) \ldots w''_{b,1,r}(F(b))$ and a second set of channel estimates $w''_{b,2,r}(1) \ldots w''_{b,2,r}(F(b))$. The first set of channel estimates may be associated with a plurality of RF channels between a first transmit antenna 152A of a base transceiver station 102 and one or more receive antennas 222 of the mobile communication device 114. The second set of channel estimates may be associated with a plurality of RF channels between a second transmit antenna 152D of the base transceiver station 102 and one or more receive antennas 222 of the mobile communication device 114. The one or more circuits and/or processors may modify the second set of channel estimates based on a comparison of a measure of correlation between the first set of channel estimates and the second set of channel estimates with a threshold. The first set of channel estimates $w''_{b,1,r}(1) \ldots w''_{b,1,r}(F(b))$ and/or the modified second set of channel estimates $w'_{b,2,r}(1) \ldots w'_{b,2,r}(F(b))$ may be utilized for processing received signals. In instances that the measure of correlation is below the threshold, the second set of channel estimates may be modified such that the modified second set of channel estimates $w'_{b,2,r}(1) \ldots w'_{b,2,r}(F(b))$ is orthogonal to the first set of channel estimates $w''_{b,1,r}(1) \ldots w''_{b,1,r}(F(b))$. In instances that the measure of correlation is above the threshold, the second set of channel estimates may be modified such that the modified second set of channel estimates $w'_{b,2,r}(1) \ldots w'_{b,2,r}(F(b))$ is a set of zeros.

The first set of channel estimates may be normalized with respect to total power received over all of the plurality of RF channels between the first transmit antenna 152A and the one or more receive antennas 222. The second set of channel estimates may be normalized with respect to total power received over all of the plurality of RF channels between the second transmit antenna 152D and the one or more receive antennas. The threshold may be dynamically determined. The second set of channel estimates may be disregarded in instances that the measure of correlation is above a threshold. Each channel estimate in the first set of channel estimates may indicate a complex channel gain between the first transmit antenna 152A and one of the one or more receive antennas 222. Each channel estimate in the second set of channel estimates may indicate a complex channel gain between the second transmit antenna 152D and one of the one or more receive antennas 222. The base transceiver station 102 may be a non-listened base transceiver station. Interference may be suppressed in the received signals based on the first set of channel estimates and/or the modified second set of channel estimates.

Another embodiment of the invention may provide a machine and/or computer readable medium, having stored thereon, a computer program having at least one code section executable by a machine and/or computer, thereby causing the machine and/or computer to perform the steps as described herein for channel estimation for interference suppression.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing, the method comprising:
performing by one or more circuits and/or processors in a mobile communication device:
comparing with a threshold, a value that corresponds to a measure of correlation between a first set of channel estimates and a second set of channel estimates;
cancelling interference in received signals utilizing said first set of channel estimates, when said value is above said threshold; and
modifying said second set of channel estimates and cancelling interference in received signals utilizing said first set of channel estimates and said modified second set of estimates, when said value is below said threshold.

2. The method according to claim 1, wherein:
said first set of channel estimates are associated with a plurality of RF channels between a first transmit antenna of a base transceiver station and one or more receive antennas of said mobile communication device; and
said second set of channel estimates are associated with a plurality of RF channels between a second transmit antenna of a base transceiver station and one or more receive antennas of said mobile communication device.

3. The method according to claim 1, comprising modifying one or both of said first set of channel estimates and said second said of channel estimates to generate two sets of channel estimates that are orthogonal, when said value is below said threshold.

4. The method according to claim 1, comprising modifying said second set of channel estimates by setting each estimate in the second set to zero, when said value is above said threshold.

5. The method according to claim 1, comprising normalizing said first set of channel estimates with respect to total power received over said plurality of RF channels between said first transmit antenna and said one or more receive antennas.

6. The method according to claim 1, comprising normalizing said second set of channel estimates with respect to total power received over said plurality of RF channels between said second transmit antenna and said one or more receive antennas.

7. The method according to claim 1, comprising dynamically determining said threshold.

8. The method according claim 1, comprising disregarding said second set of channel estimates when said value is above said threshold.

9. The method according to claim 1, wherein each channel estimate in said first set of channel estimates indicates a complex channel gain between said first transmit antenna and one of said one or more receive antennas.

10. The method according to claim 1, wherein each channel estimate in said second set of channel estimates indicates a complex channel gain between said second transmit antenna and one of said one or more receive antennas.

11. The method according to claim 1, wherein said base transceiver station is a non-listened base transceiver station.

12. The method according to claim 1, comprising suppressing interference in said received signals based on said first set of channel estimates and/or said modified second set of channel estimates.

13. A system for signal processing, the system comprising:
one or more circuits and/or processors for use in a mobile communication device, wherein said one or more circuits are operable to:
compare with a threshold a value that corresponds to a measure of correlation between a first set of channel estimates and a second set of channel estimates;
cancelling interference in received signals utilizing said first set of channel estimates, when said value is above said threshold; and
modify said second set of channel estimates and cancelling interference in received signals utilizing said first set of channel estimates and said modified second set of estimates, when said value is below said threshold.

14. The system according to claim 13, wherein:
said first set of channel estimates are associated with a plurality of RF channels between a first transmit antenna of a base transceiver station and one or more receive antennas of said mobile communication device; and
said second set of channel estimates are associated with a plurality of RF channels between a second transmit antenna of a base transceiver station and one or more receive antennas of said mobile communication device.

15. The system according to claim 13, wherein said one or more circuits and/or processors are configured to modify one or both of said first set of channel estimates and said second said of channel estimates to generate two sets of channel estimates that are orthogonal, when said value is below said threshold.

16. The system according to claim 13, wherein said one or more circuits and/or processors are configured to modify said second set of channel estimates by setting each estimate in the second set to zero, when said value is above said threshold.

17. The system according to claim 13, wherein said one or more circuits and/or processors are configured to normalize said first set of channel estimates with respect to total power received over said plurality of RF channels between said first transmit antenna and said one or more receive antennas.

18. The system according to claim 13, wherein said one or more circuits and/or processors are configured to normalize said second set of channel estimates with respect to total power received over said plurality of RF channels between said second transmit antenna and said one or more receive antennas.

19. The system according to claim 13, wherein said one or more circuits and/or processors are configured to dynamically determine said threshold.

20. The system according claim 13, wherein said one or more circuits and/or processors are configured to disregard said second set of channel estimates, when said value is above said threshold.

21. The system according to claim 13, wherein each channel estimate in said first set of channel estimates indicates a complex channel gain between said first transmit antenna and one of said one or more receive antennas.

22. The system according to claim 13, wherein each channel estimate in said second set of channel estimates indicates a complex channel gain between said second transmit antenna and one of said one or more receive antennas.

23. The system according to claim 13, wherein said base transceiver station is a non-listened base transceiver station.

24. The system according to claim 13, wherein said one or more circuits and/or processors are configured to suppress interference in said received signals based on said first set of channel estimates and/or said modified second set of channel estimates.

* * * * *

UNITED STATES PATENT AND TRADEMARK OFFICE
CERTIFICATE OF CORRECTION

PATENT NO. : 8,358,610 B2
APPLICATION NO. : 12/615237
DATED : January 22, 2013
INVENTOR(S) : Luo et al.

It is certified that error appears in the above-identified patent and that said Letters Patent is hereby corrected as shown below:

Column 23, Line 3, please replace "second said" with --second set--.

Column 23, Line 23, please replace "according claim 1" with --according to claim 1--.

Column 24, Line 13, please replace "said of channel" with --set of channel--.

Signed and Sealed this
Nineteenth Day of March, 2013

Teresa Stanek Rea
*Acting Director of the United States Patent and Trademark Office*